United States Patent [19]

Tobias et al.

[11] 4,405,764

[45] Sep. 20, 1983

[54] THERMOSETTABLE POLYESTER RESIN COMPOSITIONS CONTAINING CAPROLACTONE

[75] Inventors: Michael A. Tobias, Bridgewater; Conrad L. Lynch, Metuchen, both of N.J.

[73] Assignee: Mobil Oil Corporation, New York, N.Y.

[21] Appl. No.: 454,816

[22] Filed: Dec. 30, 1982

[51] Int. Cl.³ .................... C08G 63/76; C08F 283/02
[52] U.S. Cl. .................................... 525/443; 528/302; 528/308
[58] Field of Search .................... 525/443, 302, 308

[56] References Cited

U.S. PATENT DOCUMENTS 4,113,793 9/1978 Sekmakas ..................... 528/308 X
4,332,701 6/1982 Ponyik et al. .................. 525/443 X Primary Examiner—Lucille M. Phynes
Attorney, Agent, or Firm—Alexander J. McKillop; James F. Powers, Jr.; Edward J. Trojnar

[57] ABSTRACT

Thermosetting polyesters and their preparation comprising diol, triol, benzenedicarboxylic acid and, as an essential ingredient are disclosed, as well as coating compositions containing those polyesters with crosslinking agents such as aminoplast.

8 Claims, No Drawings

THERMOSETTABLE POLYESTER RESIN COMPOSITIONS CONTAINING CAPROLACTONE

BACKGROUND OF THE INVENTION

A wide variety of thermosettable polyester resin compositions are known. The compositions are generally well suited for coating applications, particularly when combined with cross-linking agents such as aminoplast resins. Our U.S. Pat. No. 4,238,583 discloses polyester compositions suitable for coatings comprising a benzene dicarboxylic acid, a trihydroxyalkyl compound, a short chain alkylene diol, and a longer chain dihydroxyalkyl compound such as 1,6-hexanediol. While 1,6-hexanediol results in polyesters with good performance characteristics, it is not widely commercially available at a reasonable cost in the United States. In accordance with this invention it has been determined that epsilon-caprolactone can be used advantageously instead of 1,6-hexanediol.

BRIEF DESCRIPTION OF THE INVENTION

This invention relates to thermosettable polyester resin compositions which contain epsilon-caprolactone as an essential ingredient. The compositions generally comprise a glycol, a triol, epsilon-caprolactone and a benzene dicarboxylic acid or anhydride thereof. These components are reacted to form a polyester which is suitable for use in coatings particularly in combination with aminoplast resins.

DETAILED DESCRIPTION OF THE INVENTION

The details of the preparation of polyesters and the preparation of coating compositions containing such polyesters disclosed in our U.S. Pat. No. 4,238,583, which is incorporated by reference here, in entirety.

Particularly suitable glycols for use in the preparation of polyesters in this invention include ethylene glycol, 1,2-propylene glycol, 1,3-butane diol, neopentyl glycol and 1,4-cyclohexane dimethanol. Mixtures of these diols are contemplated and are often advantageous. Generally, the polyester contains about 20 to 40 weight percent of the glycol.

Suitable triols include glycerol, trimethylol ethane and trimethylol propane. The triol is generally used in an amount of 2 to 8 percent by weight of the polyester.

The essential ingredient of the polyesters is epsilon-caprolactone in an amount of about 15 to 25 weight percent.

The benzene dicarboxylic acid comprises about 40 to 50 weight percent of the composition and is preferably isophthalic acid or a combination of isophthalic acid and phthalic anhydride.

The polyester components are esterified in a reaction which is normally carried out at temperatures between about 175° C. and about 250° C., for a period of time ranging between about 3 hours and about 10 hours. A conventional catalyst for the promotion of esterification reactions, such as dibutyltin oxide, dibutyltin dilaurate or triphenyl phosphite, can be used in catalytic amounts of about 0.01 to 1.0 percent by weight. During the reaction it is advantageous to remove the water evolved. This can be done in the conventional manner by means of a suitable trap which condenses and draws off water vapors, by azeotropic distillation with toluene or xylene, or by flushing the reactor with an inert gas to sweep the vapors away from the reactants.

The polyesters prepared in accordance with this invention are particularly well suited for conventional and high solids industrial metal application. The polyesters result in coatings which have an outstanding combination of hardness, adhesion, extendibility, flexibility, dry heat resistance and stain resistance. In formulating coatings the polyester is generally combined with an aminoplast, an acid catalyst and an inert organic solvent.

The aminoplast serves to cross-link the polyester composition. A variety of such materials are well known in the art and are commercially available. Generally, the aminoplast is a urea-aldehyde resin, a melamine-aldehyde resin, a dicyandiamide-aldehyde resin or a triazine-aldehyde.

The acid catalyst can be any of the acids well known for curing aminoplast systems. For example p-toluene sulfonic acid, benzene sulfonic acid or methyl sulfonic acid can be used.

The suitable solvents include aromatic hydrocarbons such as toluene, xylene and aromatic petroleum cuts; ketones such as methyl isobutyl ketone; alcohols such as butanol; and ether alcohols such as butyl carbitol.

Generally the coating compositions are pigmented. The preferred white pigment is titanium dioxide.

The invention is illustrated by the following non-limiting example.

EXAMPLE

A 3 l. glass flask was charged with 297 grams of neopentyl glycol, 225 grams of 1,4-cyclohexanedimethanol, 75 grams of trimethylolpropane, 300 grams of epsilon-caprolactone and 0.75 gram of dibutyltin oxide. The contents of the flask were heated to 175° C. and held for one hour. After cooling to 150° C., 603 grams of isophthalic acid and 0.75 gram of dibutylin oxide were added. The contents of the reaction vessel were gradually heated to 225° C. while removing the water of reaction through a steam jacketed distillation column. When an acid number of 9.5 was obtained, the resin was cooled slowly and reduced to 79.5 percent non-volatiles (2 hrs. E 150° C.) by the addition of methyl isobutyl ketone. The resulting polyester had an acid number of 5.7 (on non-volatiles), a hydroxyl number of 128, a Gardner-Holdt viscosity of $Z_2$-$Z_3$, a Gardner color of 3, and a weight per gallon of 9.01.

A high solids paint was made from the resin solution prepared above by combining it with 40% (on resin solids) of a partially alkylated methylated melamine, pigmenting it with Ti-Pure R960 titanium dioxide, and reducing it to 80% NVM with a 60/25/15 methyl isobutyl ketone/Butyl Carbitol/n-butanol solvent blend. The physical constants of this paint were:

85–90" #4FC 12.15 lbs/gal.

2.6 lbs. Volatile Organic Compounds (VOC)

This paint was coated at 0.9 to 1.1 mils dry film thickness (DFT) on 20 Ga Bonderite 1000 cold rolled steel and baked at 163° C. for 20 minutes. The baked film had a 93 gloss, passed 100 MEK double rubs, had a 3H–4H pencil hardness and showed only 1¼ in. of microcracks on a ⅛ in. conical mandrel test.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A thermosettable polyester resin composition comprising
   A. 25 to 40 weight percent of ethylene glycol, 1,2-propylene glycol, 1,3-butanediol, neopentyl glycol, 1,4-cyclohexanedimethanol, or mixtures thereof;
   B. 2 to 8 weight percent of glycerol, trimethylolethane, trimethylolpropane or mixtures thereof;
   C. 15 to 25 weight percent epsilon-caprolactone; and
   D. 40 to 50 weight percent of a benzenedicarboxylic acid or anhydride thereof.

2. The composition of claim 1 which contains aminoplast cross-linking agent and acid catalyst.

3. The composition of claim 1 comprising
   A. neopentyl glycol and 1,4-cyclohexanedimethanol;
   B. trimethylolpropane;
   C. epsilon-caprolactone; and
   D. isophthalic acid.

4. The composition of claim 3 which contains aminoplast cross-linking agent.

5. The composition of claim 2 which contains pigment.

6. The composition of claim 4 which contains pigment.

7. An article coated with the composition of claim 2 in which the coating has been cured by cross-linking.

8. An article coated with the composition of claim 4 in which the coating has been cured by cross-linking.